(12) United States Patent
Kawamura

(10) Patent No.: US 11,649,741 B2
(45) Date of Patent: May 16, 2023

(54) HYDRAULIC OIL CONTROL VALVE AND VALVE TIMING ADJUSTMENT DEVICE

(71) Applicant: DENSO CORPORATION, Kariya (JP)

(72) Inventor: Futoshi Kawamura, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/483,499

(22) Filed: Sep. 23, 2021

(65) Prior Publication Data

US 2022/0010696 A1 Jan. 13, 2022

Related U.S. Application Data

(63) Continuation of application No. PCT/JP2020/012716, filed on Mar. 23, 2020.

(30) Foreign Application Priority Data

Mar. 25, 2019 (JP) .............................. JP2019-055913

(51) Int. Cl.
*F01L 1/344* (2006.01)
*F16K 11/07* (2006.01)

(52) U.S. Cl.
CPC ........ *F01L 1/3442* (2013.01); *F16K 11/0716* (2013.01); *F01L 2001/3443* (2013.01)

(58) Field of Classification Search
CPC ......... F01L 1/3442; F01L 1/022; F01L 1/053; F01L 1/46; F01L 2001/3443;

(Continued)

(56) References Cited

U.S. PATENT DOCUMENTS

2015/0300212 A1 10/2015 Bayrakdar
2016/0169060 A1* 6/2016 Fischer .................. F01L 1/047
123/90.17

(Continued)

FOREIGN PATENT DOCUMENTS

DE 10 2016 204 973 9/2017
DE 102016204973 A1 * 9/2017

(Continued)

OTHER PUBLICATIONS

JP2016-044652 Machine Translation (Year: 2016).*

(Continued)

*Primary Examiner* — Devon C Kramer
*Assistant Examiner* — Wesley G Harris
(74) *Attorney, Agent, or Firm* — Nixon & Vanderhye P.C.

(57) ABSTRACT

A hydraulic oil control valve is coaxially disposed with a rotational axis of a valve timing adjustment device. The hydraulic oil control valve includes a sleeve and a spool sliding in an axial direction within the sleeve. The spool has an inner space serving as a drain passage through which the hydraulic oil discharged from a phase shifting portion flows. The spool defines a drain inlet that guides the hydraulic oil discharged from the phase shifting portion into the drain passage. At least one of the sleeve or the spool defines an opening through which the hydraulic oil in the drain passage is discharged from the hydraulic oil control valve. A protrusion is formed between the drain inlet and the opening to extend radially inward beyond the drain inlet.

7 Claims, 8 Drawing Sheets

(58) Field of Classification Search
CPC ... F01L 2001/34456; F01L 2001/34469; F01L 2001/34479; F01L 2301/00; F16K 11/0704; F16K 11/0716; F16K 27/041; F16K 31/0613; F16K 11/07; Y10T 137/86622; Y10T 137/8122; Y10T 137/794

See application file for complete search history.

(56) References Cited

U.S. PATENT DOCUMENTS

| | | |
|---|---|---|
| 2016/0230612 A1 | 8/2016 | Schulze et al. |
| 2017/0022854 A1 | 1/2017 | Takada |
| 2018/0135471 A1 | 5/2018 | Kajita et al. |
| 2019/0323388 A1 | 10/2019 | Mitsutani |
| 2019/0323389 A1 | 10/2019 | Mitsutani et al. |
| 2019/0323392 A1 | 10/2019 | Mitsutani |
| 2019/0368387 A1 | 12/2019 | Mitsutani |

FOREIGN PATENT DOCUMENTS

| | | | | |
|---|---|---|---|---|
| JP | 2016-44652 | 4/2016 | | |
| JP | 2016-130467 | 7/2016 | | |
| JP | 2020-159201 | 10/2020 | | |
| JP | 2020-159203 | 10/2020 | | |
| JP | 2020-159204 | 10/2020 | | |
| WO | 2016/021328 | 11/2016 | | |
| WO | WO-2018135586 A1 * | 7/2018 | ............. | F01L 1/344 |
| WO | 2020/196404 | 10/2020 | | |
| WO | 2020/196418 | 10/2020 | | |
| WO | 2020/196454 | 10/2020 | | |
| WO | 2020/196456 | 10/2020 | | |
| WO | 2020/196457 | 10/2020 | | |

OTHER PUBLICATIONS

U.S. Appl. No. 17/483,239, to Kawamura, entitled "Hydrauuc Oil Control, Valve and Valve Timing Adjustment Device", filed Sep. 23, 2021 (41 pages).

U.S. Appl. No. 17/483,371, to Kawamura, entitled "Hydraulic Oil Control Valve and Valve Timing Adjustment Device", filed Sep. 23, 2021 (33 pages).

U.S. Appl. No. 17/483,437, to Kawamura, entitled "Hydraulic Oil Control Valve and Valve Timing Adjustment Device", filed Sep. 23, 2021 (47 Pages).

U.S. Appl. No. 17/483,540, to Kawamura, entitled "Hydraulic Oil Control Valve and Valve Timing Adjustment Device", filed Sep. 23, 2021 (53 pages).

U.S. Appl. No. 17/483,605, to Kawamura, entitled "Valve Timing Adjustment Device", filed Sep. 23, 2021 (3-4 pages).

* cited by examiner

HYDRAULIC OIL CONTROL VALVE AND VALVE TIMING ADJUSTMENT DEVICE

CROSS REFERENCE TO RELATED APPLICATION

The present application is a continuation application of International Patent Application No. PCT/JP2020/012716 filed on Mar. 23, 2020, which designated the U.S. and claims the benefit of priority from Japanese Patent Application No. 2019-055913 filed on Mar. 25, 2019. The entire disclosures of all of the above applications are incorporated herein by reference.

TECHNICAL FIELD

The present disclosure relates to a hydraulic oil control valve used for a valve timing adjustment device.

BACKGROUND

A hydraulic valve timing adjustment device that is capable of adjusting valve timing of an intake valve or an exhaust valve of an internal combustion engine has been known. A hydraulic oil control valve of the hydraulic valve timing adjustment device switches oil passages by sliding a spool inside a cylindrical sleeve that is fastened to an end portion of a camshaft. The spool of the hydraulic oil control valve has an inner space serving as a drain passage for the hydraulic oil discharged from hydraulic chambers.

SUMMARY

A hydraulic oil control valve is used for a valve timing adjustment device. The valve timing adjustment device is configured to adjust valve timing of a valve and fixed to an end portion of one shaft that is a drive shaft or a driven shaft. The driven shaft is configured to selectively open and close the valve with a driving force transmitted from the drive shaft. The hydraulic oil control valve is coaxially disposed with a rotational axis of the valve timing adjustment device and configured to control a flow of a hydraulic oil supplied from a hydraulic oil supply source. The hydraulic oil control valve includes a tubular sleeve and a tubular spool. The spool has an end portion in contact with an actuator and is slidably moved by the actuator in an axial direction within the sleeve. The spool has an inner space serving as at least a portion of a drain passage through which the hydraulic oil discharged from a phase shifting portion of the valve timing adjustment device flows. The spool defines a drain inlet that guides the hydraulic oil discharged from the phase shifting portion into the drain passage. At least one of the sleeve or the spool defines an opening through which the hydraulic oil in the drain passage flows out of the hydraulic oil control valve. The hydraulic oil control valve further includes a protrusion disposed at a position between the drain inlet and the opening. The protrusion extends inward in a radial direction beyond the drain inlet.

DESCRIPTION OF EMBODIMENTS

Figure 1:
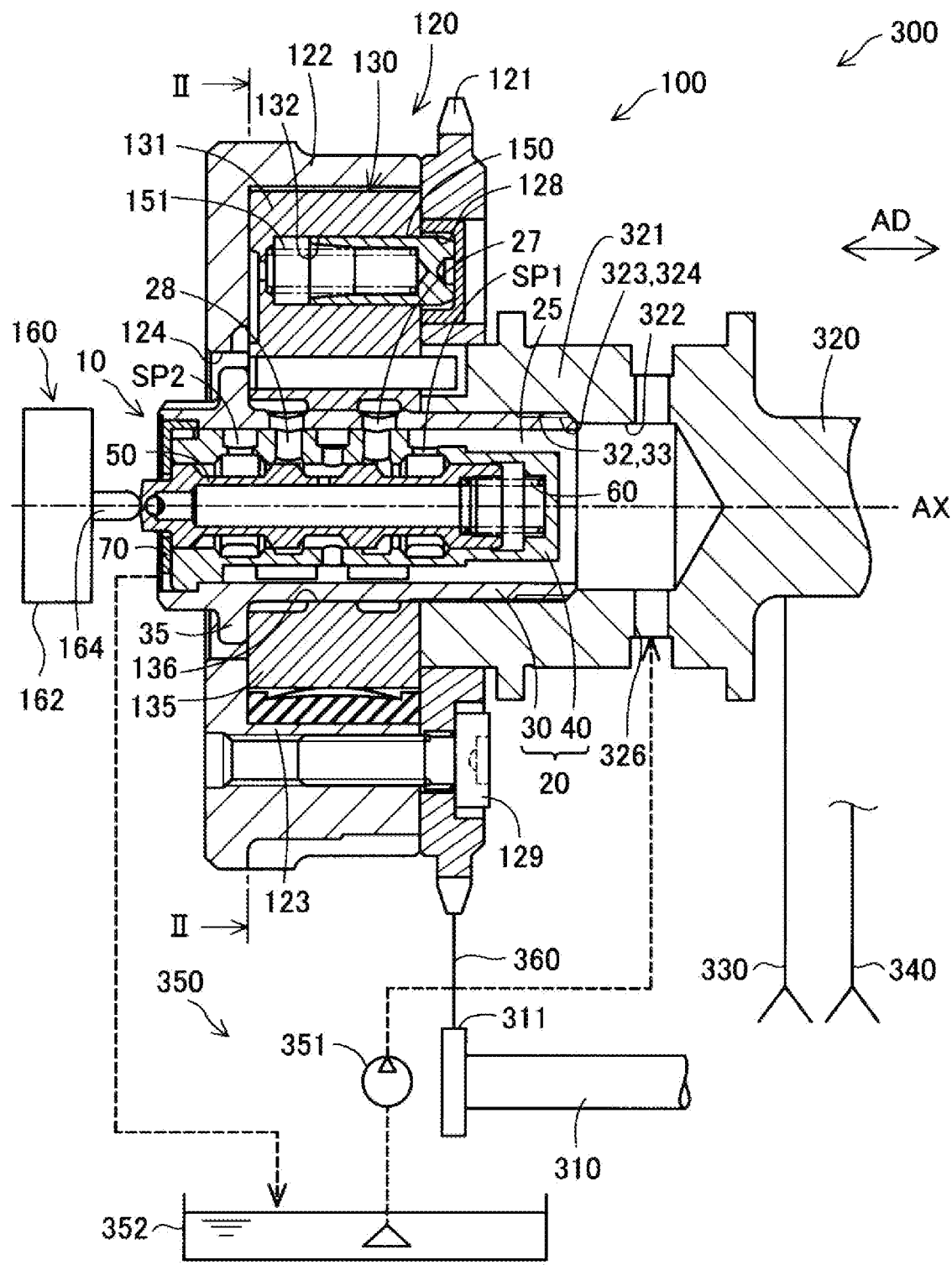
FIG. 1 is a cross-sectional view showing a schematic configuration of a valve timing adjustment device including a hydraulic oil control valve of a first embodiment.

To begin with, examples of relevant techniques will be described.

A hydraulic valve timing adjustment device that is capable of adjusting valve timing of an intake valve or an exhaust valve of an internal combustion engine has been known. In the hydraulic valve timing adjustment device, a supply of a hydraulic oil into hydraulic chambers defined by a vane rotor in a housing and a discharge of the hydraulic oil from the hydraulic chambers may be achieved by a hydraulic oil control valve disposed in a center portion of the vane rotor. For example, a hydraulic oil control valve switches oil passages by sliding a spool inside a cylindrical sleeve that is fastened to an end portion of a camshaft. The spool of the hydraulic oil control valve has an inner space serving as a drain passage for the hydraulic oil discharged from hydraulic chambers.

In the hydraulic oil control valve, the hydraulic chambers are sometimes in negative pressure because a position of a vane rotor in a circumferential direction is changed by a cam torque of a camshaft pushing a cylinder. When the hydraulic chambers are in negative pressure, air is drawn into the hydraulic chambers from the drain passage and the vane rotor may become a negative pressure state, air is sucked from the drain passage into each hydraulic chamber, and the vane rotor may rattle. Therefore, a technique to restrict air from being drawn into the hydraulic chambers from the drain passage is needed.

The present disclosure may be provided by the following embodiments.

According to one embodiment of the present disclosure, a hydraulic oil control valve is provided. The hydraulic oil control valve is used for a valve timing adjustment device. The valve timing adjustment device is configured to adjust valve timing of a valve and fixed to an end portion of one shaft that is a drive shaft or a driven shaft. The driven shaft is configured to selectively open and close the valve with a driving force transmitted from the drive shaft. The hydraulic oil control valve is coaxially disposed with a rotational axis of the valve timing adjustment device and configured to control a flow of a hydraulic oil supplied from a hydraulic oil supply source. The hydraulic oil control valve includes a tubular sleeve and a tubular spool. The spool has an end portion in contact with an actuator and is slidably moved by the actuator in an axial direction within the sleeve. The spool has an inner space serving as at least a portion of a drain passage through which the hydraulic oil discharged from a phase shifting portion of the valve timing adjustment device flows. The spool defines a drain inlet that guides the hydraulic oil discharged from the phase shifting portion into the drain passage. At least one of the sleeve or the spool defines an opening through which the hydraulic oil in the drain passage flows out of the hydraulic oil control valve. The hydraulic oil control valve further includes a protrusion disposed at a position between the drain inlet and the opening. The protrusion extends inward in a radial direction beyond the drain inlet.

According to the hydraulic oil control valve, the protrusion is disposed at a position between the drain inlet and the opening. The protrusion extends inward in the radial direction beyond the drain inlet. Here, since the hydraulic oil control valve is fixed to the end of one shaft, the hydraulic oil control valve is always rotated together with the one shaft during an operation of an internal combustion engine. Therefore, the hydraulic oil can be stored in the drain passage between the protrusion and the drain inlet due to a centrifugal force of a rotation of the hydraulic oil control valve and an oil film can be formed on an inner circumferential surface of the spool. Thus, the oil film can prevent air in the drain passage from being drawn into the hydraulic chambers in negative pressure.

The present disclosure can be realized as the following embodiments. For example, it can be realized in a method for manufacturing a hydraulic oil control valve, a valve timing adjustment device provided with a hydraulic oil control valve, a method for manufacturing the valve timing adjustment device, and the like.

A. First Embodiment

A-1. Device Configuration:

A valve timing adjustment device 100 shown in FIG. 1 is used for an internal combustion engine 300 of a vehicle (not shown) and configured to adjust valve timing of a valve that is opened or closed by a camshaft 320 to which a driving force is transmitted from a crankshaft 310. The valve timing adjustment device 100 is provided in a power transmission path from the crankshaft 310 to the camshaft 320. More specifically, the valve timing adjustment device 100 is fixed to an end portion 321 of the camshaft 320 in a direction along a rotational axis AX of the camshaft 320 (hereinafter, referred to as "an axial direction AD"). The valve timing adjustment device 100 has a rotational axis AX that is coaxial with the rotational axis AX of the camshaft 320. The valve timing adjustment device 100 of the present embodiment is configured to adjust valve timing of an intake valve 330 among the intake valve 330 and an exhaust valve 340.

The end portion 321 of the camshaft 320 defines a shaft hole portion 322 and a supply inlet 326. The shaft hole portion 322 extends in the axial direction AD. The shaft hole portion 322 has a shaft fixing portion 323 on an inner circumferential surface of the shaft hole portion 322 to fix a hydraulic oil control valve 10 which will be described later. The shaft fixing portion 323 has a female thread portion 324. The female thread portion 324 is screwed with a male thread portion 33 formed in a fixing portion 32 of the hydraulic oil control valve 10. The supply inlet 326 extends in a radial direction and passes through the camshaft 320 between an outer circumferential surface of the camshaft 320 and the shaft hole portion 322. Hydraulic oil is supplied to the supply inlet 326 from a hydraulic oil supply source 350. The hydraulic oil supply source 350 includes an oil pump 351 and an oil pan 352. The oil pump 351 pumps the hydraulic oil stored in the oil pan 352.

Figure 2:
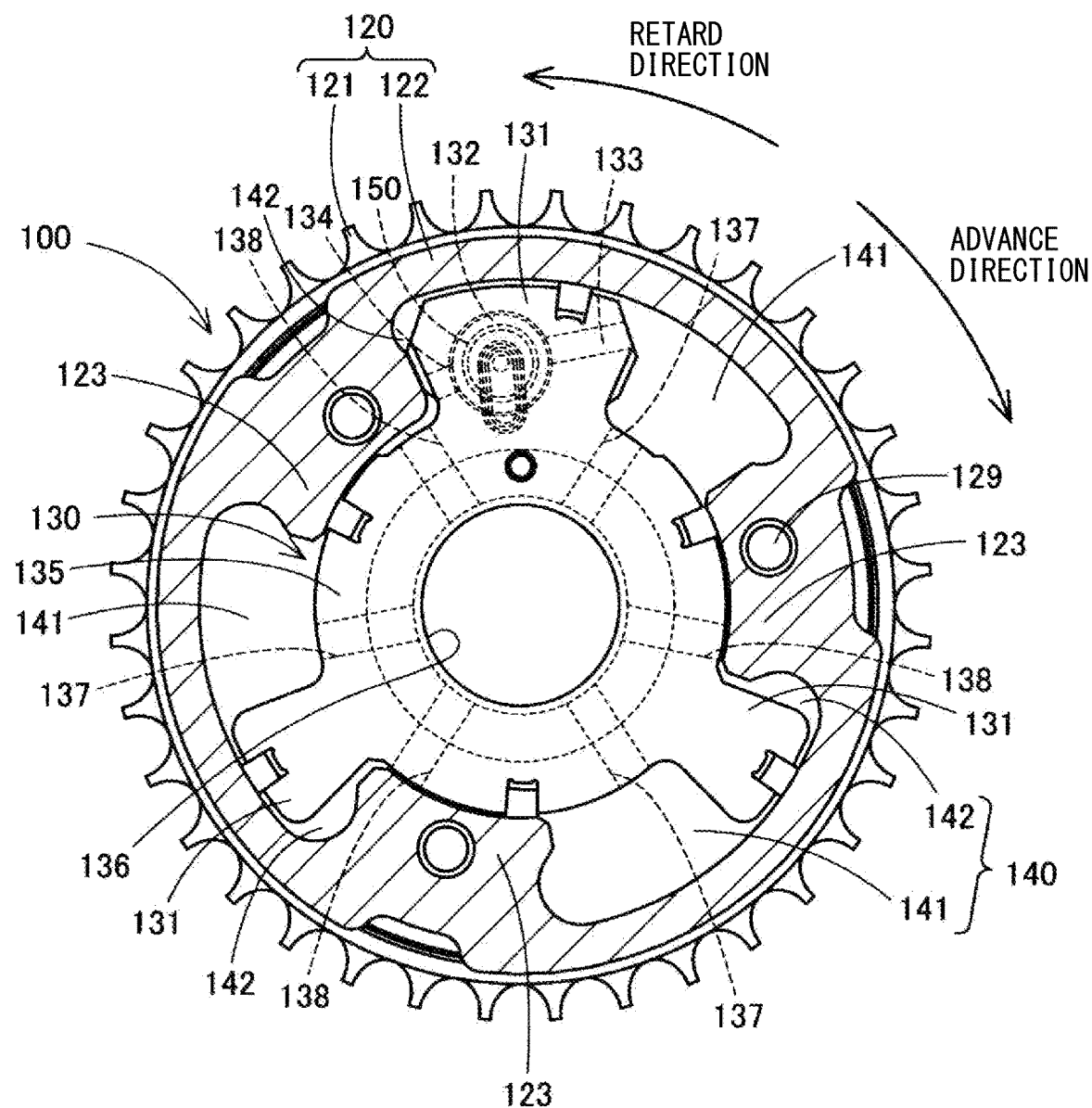
FIG. 2 is a cross-sectional view taken along a line II-II in FIG. 1.

As shown in FIGS. 1 and 2, the valve timing adjustment device 100 includes a housing 120, a vane rotor 130, and the hydraulic oil control valve 10. In FIG. 2, illustrations of the hydraulic oil control valve 10 are omitted.

As shown in FIG. 1, the housing 120 includes a sprocket 121 and a case 122. The sprocket 121 is fit to the end portion 321 of the camshaft 320 and is rotatably supported. The sprocket 121 defines a fitting recessed portion 128 at a position corresponding to a lock pin 150 which will be described later. An annular timing chain 360 is disposed around the sprocket 121 and a sprocket 311 of the crankshaft 310. The sprocket 121 is fixed to the case 122 with multiple bolts 129. Thus, the housing 120 rotates together with the crankshaft 310. The case 122 has a bottomed tubular shape and an opening end of the case 122 is closed by the sprocket 121. As shown in FIG. 2, the case 122 includes multiple partition walls 123 that protrude radially inward and are arranged in a circumferential direction. Spaces defined between adjacent ones of the partition walls 123 in the circumferential direction serve as hydraulic chambers 140. As shown in FIG. 1, the case 122 defines an opening 124 at a center of a bottom portion of the case 122.

The vane rotor 130 is housed inside the housing 120 and configured to rotate in a retard direction or in an advance direction relative to the housing 120 in accordance with a hydraulic pressure of the hydraulic oil supplied from the hydraulic oil control valve 10 which will be described later. Therefore, the vane rotor 130 serves as a phase shifting portion configured to shift a phase of a driven shaft relative to a drive shaft. The vane rotor 130 includes multiple vanes 131 and a boss 135.

As shown in FIG. 2, the multiple vanes 131 protrude radially outward from the boss 135 that is located at a center of the vane rotor 130 and are arranged adjacent to each other in the circumferential direction. The vanes 131 are housed respectively in the hydraulic chambers 140 and divide the hydraulic chambers 140 in the circumferential direction into retard chambers 141 and advance chambers 142. The retard chamber 141 is located on one side of the vane 131 in the circumferential direction. The advance chamber 142 is located on the other side of the vane 131 in the circumferential direction. One of the multiple vanes 131 defines a housing hole 132 in the axial direction. The housing hole 132 is in communication with the retard chamber 141 through a retard chamber pin control oil channel 133 defined in the vane 131 and in communication with the advance chamber 142 through an advance chamber pin control oil channel 134. The lock pin 150 is housed in the housing hole 132 such that the lock pin 150 can reciprocate in the axial direction AD in the housing hole 132. The lock pin 150 is configured to restrict the vane rotor 130 from rotating relative to the housing 120 and restrict the vane rotor 130 from coming into contact with the housing 120 in the circumferential direction when the hydraulic pressure is insufficient. The lock pin 150 is biased in the axial direction AD toward the fitting recessed portion 128 formed in the sprocket 121 by a spring 151.

The boss 135 has a tubular shape and is fixed to the end portion 321 of the camshaft 320. Therefore, the vane rotor 130 having the boss 135 is fixed to the end portion 321 of the camshaft 320 and rotates together with the camshaft 320 in an integral manner. The boss 135 defines a through hole 136 passing through the boss 135 in the axial direction at a center of the boss 135. The hydraulic oil control valve 10 is arranged in the through hole 136. The boss 135 defines multiple retard channels 137 and multiple advance channels 138. The retard channels 137 and the advance channels 138 pass through the boss 135 in the radial direction. The retard channels 137 and the advance channels 138 are arranged in the axial direction AD. The retard channels 137 fluidly connect between the retard chambers 141 and retard ports 27 of the hydraulic oil control valve 10 which will be described later. The advance channels 138 fluidly connect between the advance chambers 142 and advance ports 28 of the hydraulic oil control valve 10 which will be described later. In the through hole 136, gaps between the retard channels 137 and the advance channels 138 are sealed by an outer sleeve 30 of the hydraulic oil control valve 10 which will be described later.

In the present embodiment, the housing 120 and the vane rotor 130 are made of an aluminum alloy, but a material of the housing 120 and the vane rotor 130 is not limited to the aluminum alloy and may be any metal material such as iron or stainless steel, a resin material, or the like.

As shown in FIG. 1, the hydraulic oil control valve 10 is coaxially arranged with the rotational axis AX of the valve timing adjustment device 100 and configured to control a flow of the hydraulic oil supplied from the hydraulic oil supply source 350. The operation of the hydraulic oil control valve 10 is controlled by an ECU (not shown) that controls an overall operation of the internal combustion engine 300. The hydraulic oil control valve 10 is driven by a solenoid 160 arranged on a side of the hydraulic oil control valve 10 opposite to the camshaft 320 in the axial direction AD. The solenoid 160 has an electromagnetic portion 162 and a shaft 164. The solenoid 160 moves the shaft 164 in the axial direction AD when the electromagnetic portion 162 is energized by instructions from the ECU. Thereby, the shaft 164 presses a spool 50 of the hydraulic oil control valve 10, which will be described later, toward the camshaft 320 against a biasing force of a spring 60. As will be described later, the spool 50 slides in the axial direction AD by being pressed, so that oil channels can be switched between oil channels in communication with the retard chambers 141 and oil channels in communication with the advance chambers 142.

Figure 3:
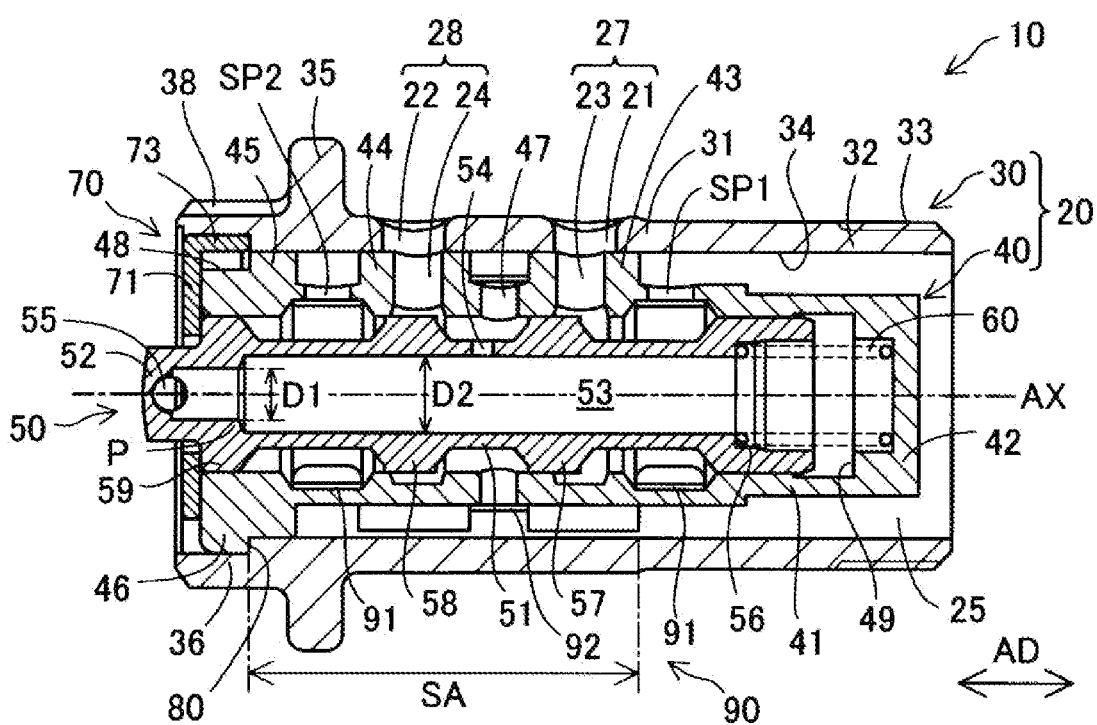
FIG. 3 is a cross-sectional view showing a detailed configuration of the hydraulic oil control valve.
Figure 4:
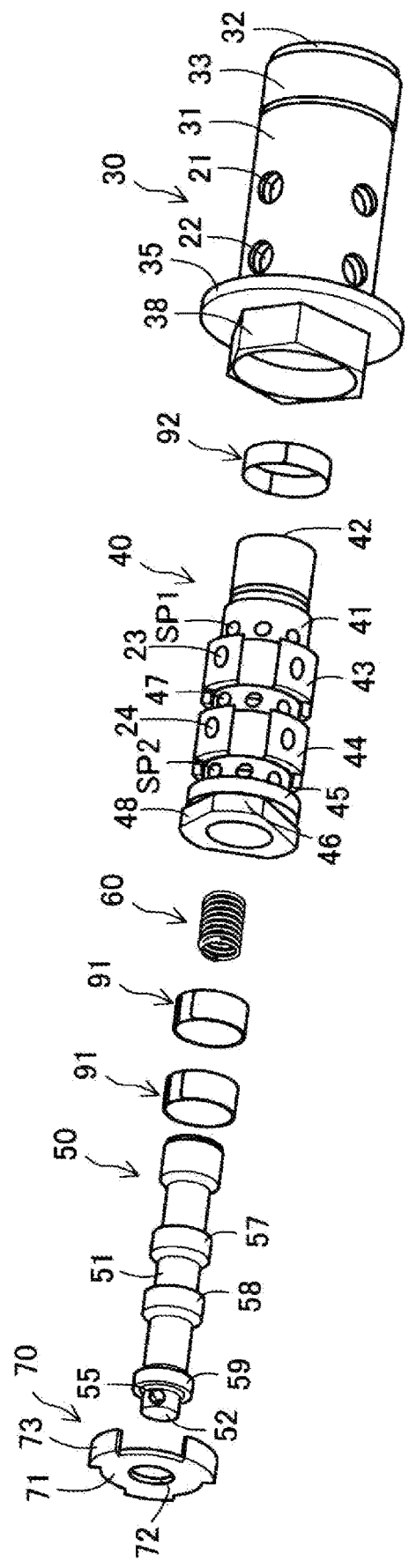
FIG. 4 is an exploded perspective view showing a detailed configuration of the hydraulic oil control valve.

As shown in FIGS. 3 and 4, the hydraulic oil control valve 10 includes a sleeve 20, the spool 50, the spring 60, a fixing member 70, and a check valve 90. FIG. 3 is a cross-sectional view taken along the rotational axis AX.

The sleeve 20 includes the outer sleeve 30 and an inner sleeve 40. Each of the outer sleeve 30 and the inner sleeve 40 substantially has a tubular shape. The sleeve 20 has a schematic configuration in which the inner sleeve 40 is inserted into an axial hole 34 defined in the outer sleeve 30.

The outer sleeve 30 forms an outer contour of the hydraulic oil control valve 10 and is disposed radially outside of the inner sleeve 40. The outer sleeve 30 has a main body 31, a fixing portion 32, a protrusion 35, a large diameter portion 36, a movement restricting portion 80, and a tool engaging portion 38. The main body 31 and the fixing portion 32 define the axial hole 34 extending in the axial direction AD. The axial hole 34 passes through the outer sleeve 30 in the axial direction AD.

The main body 31 has a tubular appearance and is arranged in the through hole 136 of the vane rotor 130 as shown in FIG. 1. As shown in FIG. 4, the main body 31 defines multiple outer retard ports 21 and multiple outer advance ports 22. The multiple outer retard ports 21 are arranged adjacent to each other in the circumferential direction and pass through the main body 31 between an outer circumferential surface of the main body 31 and the axial hole 34. The multiple outer advance ports 22 are defined between the outer retard ports 21 and the solenoid 160 in the axial direction AD. The multiple outer advance ports 22 are arranged adjacent to each other in the circumferential direction and pass through the main body 31 between the outer circumferential surface of the main body 31 and the axial hole 34.

The fixing portion 32 has a tubular shape and is connected to the main body 31 in the axial direction AD. The fixing portion 32 has a diameter substantially the same as that of the main body 31 and is inserted into the shaft fixing portion 323 of the camshaft 320 as shown in FIG. 1. The fixing portion 32 has the male thread portion 33. The male thread portion 33 is screwed with the female thread portion 324 of the shaft fixing portion 323. The male thread portion 33 and the female thread portion 324 are fastened to each other, so that an axial force in the axial direction AD toward the camshaft 320 is applied to the outer sleeve 30 and the outer sleeve 30 is fixed to the end portion 321 of the camshaft 320. With the axial force, it is possible to prevent the hydraulic oil control valve 10 from being displaced from the end portion 321 of the camshaft 320 due to an eccentric force generated when the camshaft 320 pushes the intake valve 330. Thus, it is possible to restrict the hydraulic oil from leaking.

The protrusion 35 protrudes radially outward from the main body 31. As shown in FIG. 1, the protrusion 35 holds the vane rotor 130 between the protrusion 35 and the end portion 321 of the camshaft 320 in the axial direction AD.

As shown in FIG. 3, the large diameter portion 36 is formed in an end portion of the main body 31 closer to the solenoid 160. The large diameter portion 36 has an inner diameter that is larger than those of other portions of the main body 31. In the large diameter portion 36, a flange portion 46 of the inner sleeve 40, which will be described later, is arranged.

The movement restricting portion 80 is configured as a stepped portion in the radial direction, which is formed by the large diameter portion 36, on the inner circumferential surface of the outer sleeve 30. The movement restricting portion 80 holds the flange portion 46 of the inner sleeve 40, which will be described later, between the movement restricting portion 80 and the fixing member 70 in the axial direction AD. As a result, the movement restricting portion 80 restricts the inner sleeve 40 from moving in a direction away from the electromagnetic portion 162 of the solenoid 160 in the axial direction AD.

The tool engaging portion 38 is formed between the protrusion 35 and the solenoid 160 in the axial direction AD. The tool engaging portion 38 is configured to be engaged with a tool such as a hexagon socket (not shown), and is used for fastening and fixing the hydraulic oil control valve 10 including the outer sleeve 30 to the end portion 321 of the camshaft 320.

The inner sleeve 40 has a tubular portion 41, a bottom portion 42, multiple retard protruding walls 43, multiple advance protruding walls 44, a sealing wall 45, the flange portion 46, and a stopper 49.

The tubular portion 41 substantially has a tubular shape and is located radially inside of the outer sleeve 30 between the main body 31 and the fixing portion 32. As shown in FIGS. 3 and 4, the tubular portion 41 defines retard supply ports SP1, advance supply ports SP2, and recycling ports 47. The retard supply ports SP1 are defined between the retard protruding walls 43 and the bottom portion 42 in the axial direction AD and pass through the tubular portion 41 between an outer circumferential surface and an inner circumferential surface of the tubular portion 41. In the present embodiment, the multiple retard supply ports SP1 are arranged in the circumferential direction on a half circumference of the tubular portion 41. However, the multiple retard supply ports SP1 may be arranged on an all circumference of the tubular portion 41 or the tubular portion 41 may have a single retard supply port SP1. The advance supply ports SP2 are defined between the advance protruding walls 44 and the solenoid 160 in the axial direction AD and pass through the tubular portion 41 between the outer circumferential surface and the inner circumferential surface of the tubular portion 41. In the present embodiment, the multiple advance supply ports SP2 are arranged on a half circumference of the tubular portion 41 in the circumferential direction. However, the multiple advance supply ports SP1 may be arranged on an all circumference of the tubular portion 41 or the tubular portion 41 may have a single advance supply port SP2. The retard supply ports SP1 and the advance supply ports SP2 are in communication with the shaft hole portion 322 of the camshaft 320 shown in FIG. 1. As shown in FIGS. 3 and 4, the recycling ports 47 are defined between the retard protruding walls 43 and the advance protruding walls 44 in the axial direction AD and pass through the tubular portion 41 between the outer circumferential surface and the inner circumferential surface of the tubular portion 41. The recycling ports 47 are in communication with the retard supply ports SP1 and the advance supply ports SP2. Specifically, the recycling ports 47 are in communication with the retard supply ports SP1 through spaces that are defined between the inner circumferential surface of the main body 31 of the outer sleeve 30 and the outer circumferential surface of the tubular portion 41 of the inner sleeve 40 and that are defined between adjacent ones of the retard protruding walls 43 in the circumferential direction. The recycling ports 47 are in communication with the advance supply ports SP2 through spaces that are defined between the inner circumferential surface of the main body 31 of the outer sleeve 30 and the outer circumferential surface of the tubular portion 41 of the inner sleeve 40 and that are defined between adjacent ones of the advance protruding walls 44 in the circumferential direction. Therefore, the recycling ports 47 serve as a recycling mechanism for returning the hydraulic oil discharged from the retard chambers 141 or the advance chambers 142 to the supply source. In the present embodiment, multiple recycling ports 47 are formed adjacent to each other in the circumferential direction, but the tubular portion 41 may have a single recycling port 47. An operation of the valve timing adjustment device 100 including a switching of the oil channels by sliding the spool 50 will be described later.

As shown in FIG. 3, the bottom portion 42 is integrally formed with the tubular portion 41 and closes an end portion of the tubular portion 41 away from the solenoid 160 (in other words, an end portion of the tubular portion 41 closer to the camshaft 320) in the axial direction AD. One end of the spring 60 is in contact with the bottom portion 42.

As shown in FIG. 4, the multiple retard protruding walls 43 protrude radially outward from the tubular portion 41 and are arranged adjacent to each other in the circumferential direction. The retard protruding walls 43 define spaces therebetween in the circumferential direction. The spaces are in communication with the shaft hole portion 322 of the camshaft 320 shown in FIG. 1 and the hydraulic oil supplied from the hydraulic oil supply source 350 flows through the spaces. As shown in FIGS. 3 and 4, the retard protruding walls 43 respectively define inner retard ports 23. The inner retard ports 23 pass through the retard protruding walls 43 between an outer circumferential surface and an inner circumferential surface of the retard protruding walls 43. As shown in FIG. 3, the inner retard ports 23 are respectively in communication with the outer retard ports 21 defined in the outer sleeve 30. The inner retard port 23 has an axis that is displaced from an axis of the outer retard port 21 in the axial direction AD.

As shown in FIG. 4, the multiple advance protruding walls 44 are disposed between the retard protruding walls 43 and the solenoid 160 in the axial direction AD. The multiple advance protruding walls 44 protrude radially outward from the tubular portion 41 and are arranged adjacent to each other in the circumferential direction. The advance protruding walls 43 define spaces therebetween in the circumferential direction. The spaces are in communication with the shaft hole portion 322 shown in FIG. 1 and the hydraulic oil supplied from the hydraulic oil supply source 350 flows through the spaces. As shown in FIGS. 3 and 4, the advance protruding walls 44 respectively define inner advance ports 24. Each of the inner advance ports 24 passes through the advance protruding wall 44 between an outer circumferential surface and an inner circumferential surface of the advance protruding wall 44. As shown in FIG. 3, the inner advance ports 24 are respectively in communication with the outer advance ports 22 defined in the outer sleeve 30. The inner advance port 24 has an axis that is displaced from an axis of the outer advance port 22 in the axial direction AD.

The sealing wall 45 protrudes radially outward from an entire circumference of the tubular portion 41. The sealing wall 45 is disposed between the advance supply ports SP2 and the solenoid 160 in the axial direction AD. The sealing wall 45 seals a gap between the inner circumferential surface of the main body 31 of the outer sleeve 30 and the outer circumferential surface of the tubular portion 41 of the inner sleeve 40, thereby restricting the hydraulic oil flowing through a hydraulic oil supply passage 25, which will be described later, from leaking toward the solenoid 160. The sealing wall 45 has an outer diameter that is substantially same as that of the retard protruding walls 43 and that of the advance protruding walls 44.

The flange portion 46 protrudes radially outward from an entire circumference of the tubular portion 41 at an end portion of the inner sleeve 40 facing the solenoid 160. The flange portion 46 is arranged in the large diameter portion 36 of the outer sleeve 30. As shown in FIG. 4, the flange portion 46 includes multiple fitting portions 48. The multiple fitting portions 48 are arranged adjacent to each other in the circumferential direction at an outer edge of the flange portion 46. In the present embodiment, the fitting portions 48 are formed by cutting off an outer edge of the flange portion 46 straight. However, the fitting portions 48 may be formed by cutting off the outer edge into a curved shape. Fitting portions 48 are fit to fitting protrusions 73 of the fixing member 70 which will be described later.

As shown in FIG. 3, the stopper 49 is formed at the end portion of the inner sleeve 40 closer to the camshaft 320 in the axial direction AD. The stopper 49 has an inner diameter smaller than that of other portion of the tubular portion 41 such that the end portion of the spool 50 closer to the camshaft 320 can come into contact with the stopper 49. The stopper 49 defines a sliding limit position of the spool 50 in a direction away from the electromagnetic portion 162 of the solenoid 160.

The inner sleeve 40 and the axial hole 34 defined in the outer sleeve 30 define a space therebetween and the space serves as the hydraulic oil supply passage 25. The hydraulic oil supply passage 25 is in communication with the shaft hole portion 322 of the camshaft 320 shown in FIG. 1 and guides the hydraulic oil supplied from the hydraulic oil supply source 350 to the retard supply ports SP1 and the advance supply ports SP2. As shown in FIG. 3, the outer retard ports 21 and the inner retard ports 23 form retard ports 27 that are in communication with the retard chambers 141 through the retard channels 137 shown in FIG. 2. As shown in FIG. 3, the outer advance ports 22 and the inner advance ports 24 form advance ports 28 that are in communication with the advance chambers 142 through the advance channels 138 shown in FIG. 2.

As shown in FIG. 3, at least a part in the axial direction AD between the outer sleeve 30 and the inner sleeve 40 is sealed to restrict a leak of the hydraulic oil. More specifically, the retard protruding walls 43 seal between the retard ports 27 and the retard supply ports SP1 and between the retard ports 27 and the recycling ports 47. The advance protruding walls 44 seal between the advance ports 28 and the advance supply ports SP2 and between the advance ports 28 and the recycling ports 47. Further, the sealing wall 45 seals between the hydraulic oil supply passage 25 and an outside of the hydraulic oil control valve 10. That is, an area in the axial direction AD between the retard protruding walls 43 and the sealing wall 45 is set as a sealing area SA. Further, in the present embodiment, the main body 31 of the outer sleeve 30 has an inner diameter that is substantially constant in the sealing area SA.

The spool 50 is arranged radially inside of the inner sleeve 40. The spool 50 has an end portion in contact with the solenoid 160 and is driven and moved in the axial direction AD by the solenoid 160.

Figure 5:
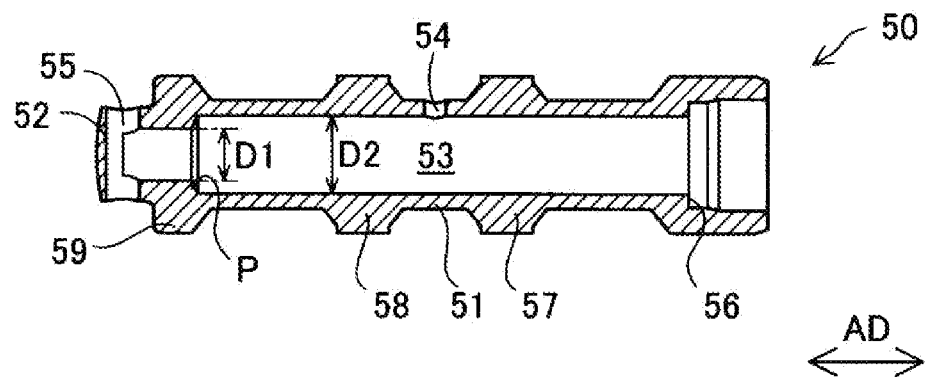
FIG. 5 is a cross-sectional view showing a detailed configuration of a spool.

As shown in FIGS. 3 and 5, the spool 50 has a spool tubular portion 51, a spool bottom portion 52, a spring receiving portion 56, and a protrusion P. Further, the spool 50 defines a drain inlet 54, a drain outlet 55, and at least a portion of a drain passage 53. Note that FIG. 5 shows a cross-section of the spool 50 rotated by 90° in the circumferential direction with respect to the cross-section shown in FIG. 3.

Figure 6:
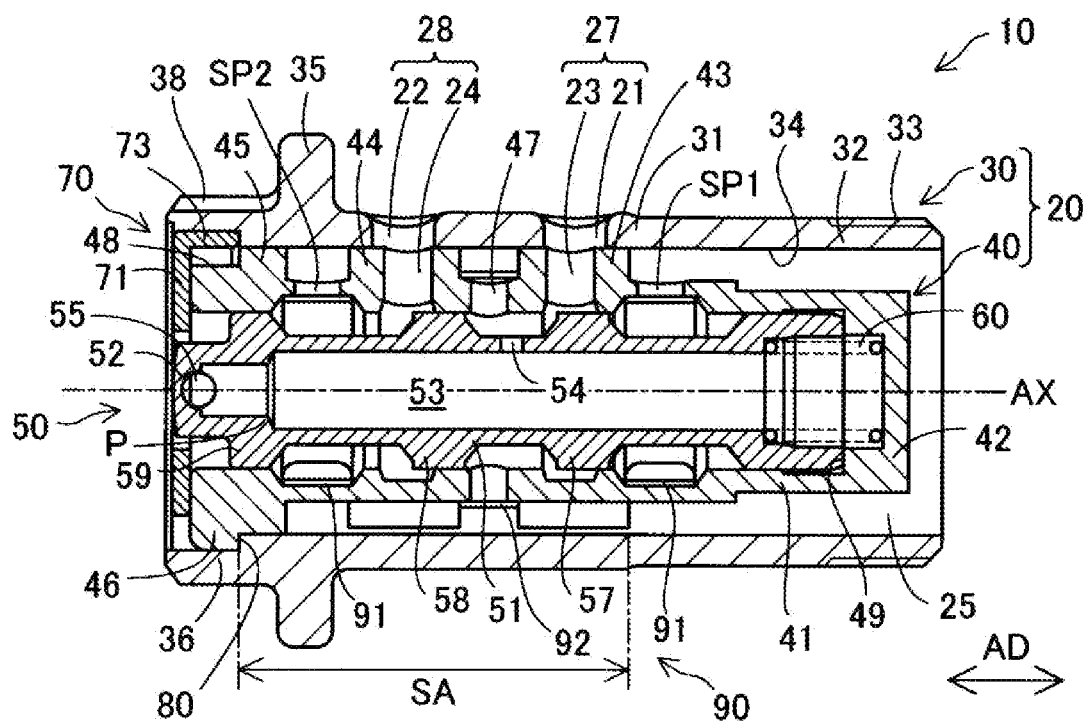
FIG. 6 is a cross-sectional view showing a state where the spool is in contact with a stopper.

As shown in FIGS. 3 and 4, the spool tubular portion 51 substantially has a tubular shape. The spool tubular portion 51 has a retard sealing portion 57, an advance sealing portion 58, and a stopper 59 on an outer circumferential surface of the spool tubular portion 51. The retard sealing portion 57, the advance sealing portion 58, and the stopper 59 are arranged in this order from the end portion of the spool 50 closer to the camshaft 320 in the axial direction AD. Each of the retard sealing portion 57, the advance sealing portion 58, and the stopper 59 protrudes radially outward entirely in the circumferential direction. As shown in FIG. 3, the retard sealing portion 57 blocks a communication between the recycling ports 47 and the retard ports 27 when the spool 50 is located at the closest position to the electromagnetic portion 162 of the solenoid 160. As shown in FIG. 6, the retard sealing portion 57 blocks a communication between the retard supply ports SP1 and the retard ports 27 when the spool 50 is located at the farthest position from the electromagnetic portion 162. As shown in FIG. 3, the advance sealing portion 58 blocks a communication between the advance supply ports SP2 and the advance ports 28 when the spool 50 is located at the closest position to the electromagnetic portion 162. As shown in FIG. 6, the advance sealing portion 58 blocks a communication between the recycling ports 47 and the advance ports 28 when the spool 50 is located at the farthest position from the electromagnetic portion 162. As shown in FIG. 3, the stopper 59 defines the sliding limit of the spool 50 toward the electromagnetic portion 162 of the solenoid 160 by coming into contact with the fixing member 70.

The spool bottom portion 52 is integrally formed with the spool tubular portion 51 and closes an end portion of the spool tubular portion 51 facing the solenoid 160. The spool bottom portion 52 can extend beyond the sleeve 20 toward the solenoid 160 in the axial direction AD. The spool bottom portion 52 serves as a proximal end portion of the spool 50.

A space surrounded by the spool tubular portion 51, the spool bottom portion 52, the tubular portion 41 of the inner sleeve 40, and the bottom portion 42 of the inner sleeve 40 serves as the drain passage 53. Therefore, the inside of the spool 50 serves as at least a part of the drain passage 53. The hydraulic oil discharged from the retard chambers 141 and the advance chambers 142 flows through the drain passage 53.

The drain inlet 54 is defined in the spool tubular portion 51 between the retard sealing portion 57 and the advance sealing portion 58 in the axial direction AD. The drain inlet 54 passes through the spool tubular portion 51 between the outer circumferential surface and the inner circumferential surface of the spool tubular portion 51. The drain inlet 54 guides the hydraulic oil discharged from the retard chambers 141 and the advance chambers 142 to the drain passage 53. Further, the drain inlet 54 is in communication with the supply ports SP1 and SP2 through the recycling ports 47.

The spool bottom portion 52, which is an end of the spool 50, defines the drain outlet 55 opening outward in the radial direction. The hydraulic oil in the drain passage 53 is discharged from the hydraulic oil control valve 10 through the drain outlet 55. As shown in FIG. 1, the hydraulic oil discharged through the drain outlet 55 is collected in the oil pan 352.

As shown in FIG. 3, the spring receiving portion 56 is formed at an end portion of the spool tubular portion 51 closer to the camshaft 320 and has an inner diameter that is larger than other portion of the spool tubular portion 51. The other end of the spring 60 is in contact with the spring receiving portion 56.

As shown in FIG. 5, the protrusion P is formed between the drain inlet 54 and the drain outlet 55 in the axial direction AD. The protrusion P is formed entirely in the circumferential direction and extends inward in the radial direction beyond the drain inlet 54. Thus, the protrusion P has an inner diameter D1 less than an inner diameter D2 of the spool tubular portion 51. In the present embodiment, the protrusion P is formed between the supply port SP2 that is located closest to the solenoid 160 and the drain outlet 55. Further, in the present embodiment, the protrusion P is formed by reducing a portion of a diameter of the spool tubular portion 51 near the spool bottom portion 52 compared to a portion of the diameter of the spool tubular portion 51 near the drain inlet 54. The protrusion P may be a wall protruding radially inward from a portion between the drain inlet 54 and the drain outlet 55.

In the present embodiment, each of the outer sleeve 30 and the spool 50, which are shown in FIG. 3, is made of iron and the inner sleeve 40 is made of aluminum. Materials of the outer sleeve 30, the spool 50, and the inner sleeve 40 are not limited to these materials, and may be any metal material, resin material, or the like.

The spring 60 is composed of a compression coil spring and has one end in contact with the bottom portion 42 of the inner sleeve 40 and the other end in contact with the spring receiving portion 56 of the spool 50. The spring 60 biases the spool 50 toward the solenoid 160 in the axial direction AD.

The fixing member 70 is fixed to the end portion of the outer sleeve 30 facing the solenoid 160. As shown in FIG. 4, the fixing member 70 includes a flat plate portion 71 and multiple fitting protrusions 73.

The flat plate portion 71 has a flat plate shape extending in the radial direction. Extending direction of the flat plate portion 71 is not limited to the radial direction and may be a direction intersecting the axial direction AD. The flat plate portion 71 defines an opening 72 at a center of the flat plate portion 71. As shown in FIG. 3, the spool bottom portion 52, which is one end of the spool 50, is inserted into the opening 72.

As shown in FIG. 4, the multiple fitting protrusions 73 protrude from the flat plate portion 71 in the axial direction AD, and are arranged side by side in the circumferential direction. Protruding direction of the fitting protrusions 73 is not limited to the axial direction AD and may be any direction intersecting the radial direction. The fitting protrusions 73 fit to the fitting portions 48 of the inner sleeve 40 respectively.

As shown in FIG. 3, the spool 50 is inserted into the inner sleeve 40 and the fixing member 70 is assembled such that the fitting protrusions 73 fit to the fitting portions 48. After that, the fixing member 70 is deformed to be fixed to the outer sleeve 30. An outer edge portion of the end surface of the fixing member 70 facing the solenoid 160 serves as deformed portions 74 that are deformed to be fixed to the outer sleeve 30.

The fixing member 70 is fixed to the outer sleeve 30 while the fitting protrusions 73 fit to the fitting portions 48. Thus, the inner sleeve 40 is restricted from rotating in the circumferential direction relative to the outer sleeve 30. Further, the fixing member 70 is fixed to the outer sleeve 30, so that the inner sleeve 40 and the spool 50 are restricted from coming off from the outer sleeve 30 in the axial direction AD toward the solenoid 160.

The check valve 90 suppresses a backflow of the hydraulic oil. The check valve 90 includes two supply check valves 91 and a recycling check valve 92. As shown in FIG. 4, each of the supply check valves 91, and the recycling check valve 92 are formed by winding a band-shaped thin plate into an annular shape, so that each of the supply check valves 91 and the recycling check valve 92 can be elastically deformed in the radial direction. As shown in FIG. 3, each of the supply check valves 91 is arranged in contact with the inner circumferential surface of the tubular portion 41 at a position corresponding to the retard supply port SP1 or the advance supply port SP2. When each of the supply check valves 91 receives pressure of the hydraulic oil from an outside of the each of the supply check valves 91 in the radial direction, an overlapping area of the band-shaped thin plate increases and the each of the supply check valves 91 shrinks in the radial direction. The recycling check valve 92 is arranged to be in contact with the outer circumferential surface of the tubular portion 41 at a position corresponding to the recycling port 47. When the recycling check valve 92 receives the pressure of the hydraulic oil from an inside of the recycling check valve 92 in the radial direction, an overlapping area of the band-shaped thin plate decreases and expands in the radial direction.

In the present embodiment, the crankshaft 310 is a subordinate concept of the drive shaft in the present disclosure, the camshaft 320 is a subordinate concept of the driven shaft in the present disclosure, and the intake valve 330 is a subordinate concept of the valve in the present disclosure.

Further, the solenoid 160 is a subordinate concept of the actuator in the present disclosure, and the vane rotor 130 is a subordinate concept of the phase shifting portion in the present disclosure. Further, the drain outlet 55 corresponds to a subordinate concept of an opening in the present disclosure.

A-2. Operation of Valve Timing Adjustment Device:

As shown in FIG. 1, the hydraulic oil supplied from the hydraulic oil supply source 350 to the supply inlet 326 flows into the hydraulic oil supply passage 25 through the shaft hole portion 322. When the solenoid 160 is not energized and the spool 50 is located at the closest position to the electromagnetic portion 162 of the solenoid 160 as shown in FIG. 3, the retard ports 27 are in communication with the retard supply ports SP1. As a result, the hydraulic oil in the hydraulic oil supply passage 25 is supplied into the retard chambers 141, the vane rotor 130 rotates in the retard direction relative to the housing 120, and a relative rotation phase of the camshaft 320 with respect to the crankshaft 310 is shifted in the retard direction. Further, in this state, the advance ports 28 are not in communication with the advance supply ports SP2 but in communication with the recycling ports 47. As a result, the hydraulic oil discharged from the advance chambers 142 is returned to the retard supply ports SP1 through the recycling ports 47 and recirculated. Further, a part of the hydraulic oil discharged from the advance chambers 142 flows into the drain passage 53 through the drain inlet 54, and is returned to the oil pan 352 through the drain outlet 55.

When the solenoid 160 is energized and the spool 50 is located at the farthest position from the electromagnetic portion 162 of the solenoid 160 as shown in FIG. 6, i.e., when the spool 50 is in contact with the stopper 49, the advance ports 28 are in communication with the advance supply ports SP2. As a result, the hydraulic oil in the hydraulic oil supply passage 25 is supplied into the advance chambers 142, the vane rotor 130 rotates in the advance direction relative to the housing 120, and the relative rotation phase of the camshaft 320 with respect to the crankshaft 310 is shifted in the advance direction. Further, in this state, the retard ports 27 are not in communication with the retard supply ports SP1 but in communication with the recycling ports 47. As a result, the hydraulic oil discharged from the retard chambers 141 is returned to the advance supply ports SP2 through the recycling ports 47 and recirculated. Further, a part of the hydraulic oil discharged from the retard chambers 141 flows into the drain passage 53 through the drain inlet 54, and is returned to the oil pan 352 through the drain outlet 55.

Figure 7:
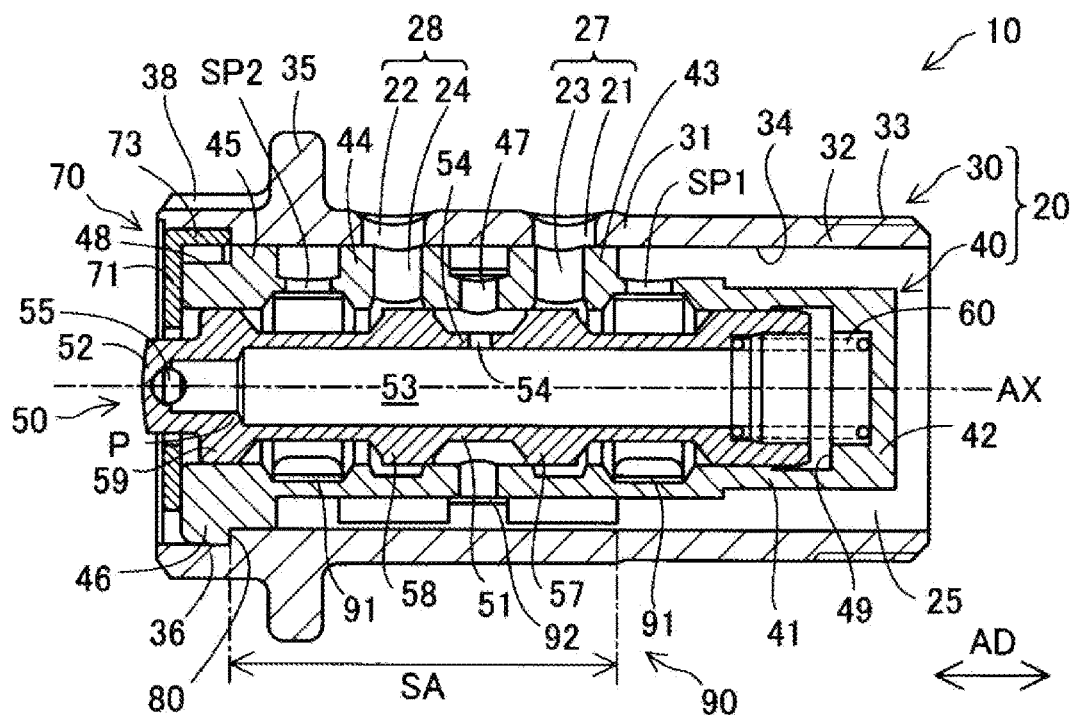
FIG. 7 is a cross-sectional view showing a state where the spool is located substantially at a center in a sliding area.

Further, as shown in FIG. 7, when the solenoid 160 is energized and the spool 50 is located substantially in the center of the sliding area, the retard ports 27 are in communication with the retard supply ports SP1 and the advance ports 28 are in communication with the advance supply ports SP2. As a result, the hydraulic oil in the hydraulic oil supply passage 25 is supplied to both the retard chambers 141 and the advance chambers 142, the vane rotor 130 is restricted from rotating relative to the housing 120, and the relative rotation phase of the camshaft 320 with respect to the crankshaft 310 is maintained.

The hydraulic oil supplied to the retard chambers 141 or the advance chambers 142 flows into the housing hole 132 through the retard chamber pin control oil channel 133 or the advance chamber pin control oil channel 134. Therefore, when sufficient hydraulic pressure is applied to the retard chambers 141 or the advance chambers 142, the lock pin 150 comes off from the fitting recessed portion 128 against the biasing force of the spring 151 by the hydraulic oil flowing into the housing hole 132. As a result, the vane rotor 130 is allowed to rotate relative to the housing 120.

When the relative rotation phase of the camshaft 320 is advanced from the target phase, the valve timing adjustment device 100 sets an energizing amount to the solenoid 160 to a relatively small value and rotates the vane rotor 130 in the retard direction relative to the housing 120. As a result, the relative rotation phase of the camshaft 320 with respect to the crankshaft 310 is shifted in the retard direction and the valve timing is retarded. Further, when the relative rotation phase of the camshaft 320 is retarded from the target value, the valve timing adjustment device 100 sets the energization amount to the solenoid 160 to a relatively large value and rotates the vane rotor 130 in the advance direction relative to the housing 120. As a result, the relative rotation phase of the camshaft 320 with respect to the crankshaft 310 is shifted in the advance direction and the valve timing is advanced. Further, when the relative rotation phase of the camshaft 320 matches the target phase, the valve timing adjustment device 100 sets the energization amount to the solenoid 160 to a medium value and restricts the vane rotor 130 from rotating relative to the housing 120. As a result, the relative rotation phase of the camshaft 320 with respect to the crankshaft 310 is maintained and the valve timing is maintained.

In the present embodiment, the hydraulic oil discharged from the vane rotor flows to the hydraulic oil control valve 10 and flows out of the hydraulic oil control valve 10 through the drain passage 53 and the drain outlet 55 regardless of whether the valve timing is adjusted in the advance direction or in the retard direction.

Figure 8:
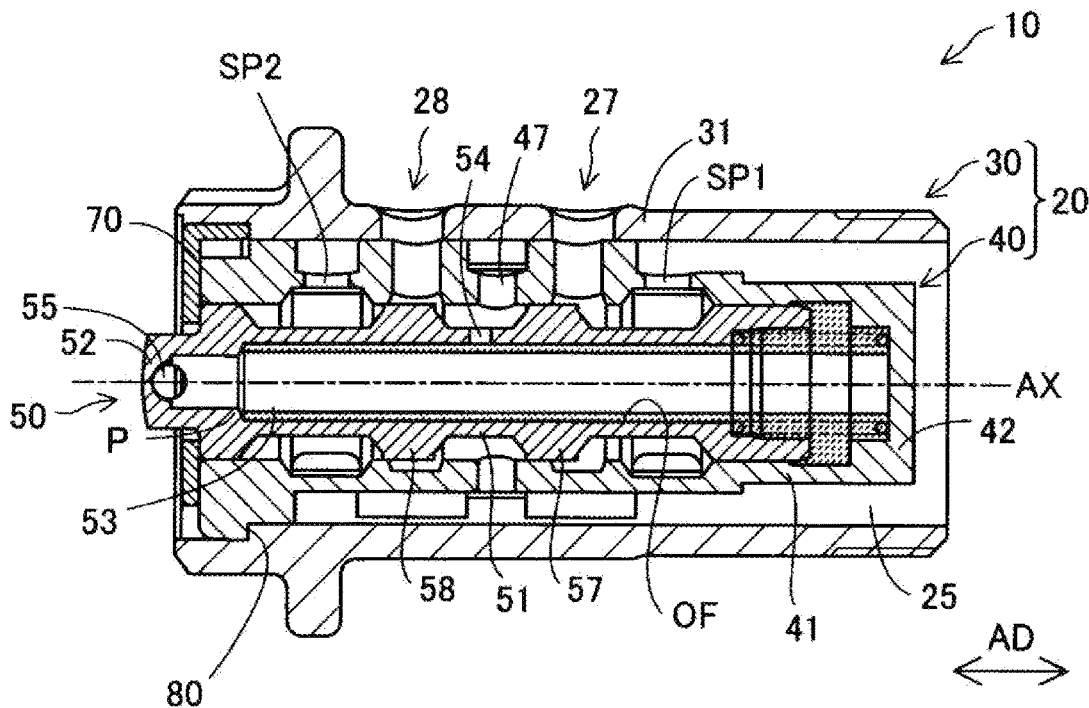
FIG. 8 is a cross-sectional view for explaining a behavior of a hydraulic oil in the drain passage.

The behavior of the hydraulic oil in the drain passage 53 will be described with reference to FIG. 8. As described above, the hydraulic oil control valve 10 is fixed to the end portion 321 of the camshaft 320 shown in FIG. 1 so that the hydraulic oil control valve 10 rotates together with the camshaft 320 during the operation of the internal combustion engine 300. Therefore, as shown in FIG. 8, the hydraulic oil having flowed into the drain passage 53 through the drain inlet 54 flows radially outward along the inner circumferential surface of the spool 50 due to a centrifugal force of the rotation of the hydraulic oil control valve 10. Here, the spool tubular portion 51 of the present embodiment includes the protrusion P protruding radially inward from a portion between the drain inlet 54 and the drain outlet 55 in the axial direction AD. Further, the spool tubular portion 51 does not include another protrusion or opening between the drain inlet 54 and the protrusion P in the axial direction AD. In addition, the spool tubular portion 51 does not define an opening through which the hydraulic oil flows out of the hydraulic oil control valve 10 between the drain inlet and the camshaft 320 in the axial direction AD. Thus, the hydraulic oil is stored, due to the centrifugal force of the rotation of the hydraulic oil control valve 10, in a portion of the drain passage 53 between the protrusion P and the camshaft 320 in the axial direction AD and an oil film OF of the hydraulic oil is formed on the inner circumferential surface of the spool 50. In other words, the protrusion P restricts the hydraulic oil having flowed into the drain passage 53 through the drain inlet 54 from immediately flowing out through the drain outlet 55.

The retard chambers 141 and the advance chambers 142 of the valve timing adjustment device 100 shown in FIG. 2 are sometimes in negative pressure because a position of the vane rotor 130 in the circumferential direction fluctuates due to a cam torque of the camshaft 320 pushing the intake valve 330 shown in FIG. 1. More specifically, as shown in FIG. 6, when the retard sealing portions 57 block communications between the retard ports 27 and the retard supply ports SP1 and the hydraulic oil is not supplied into the retard chambers 141 from the hydraulic oil control valve 10 and when volumes of the retard chambers 141 are increased due to the fluctuation of the position of the vane rotor 130 in the circumferential direction, the retard chambers 141 are converted into negative pressure. Further, as shown in FIG. 3, when the advance sealing portions 58 block communications between the advance ports 28 and the advance supply ports SP2 and the hydraulic oil is not supplied into the advance chambers 142 from the hydraulic oil control valve 10, and when volumes of the advance chambers 142 are increased due to the fluctuation of the position of the vane rotor 130 in the circumferential direction, the advance chambers 142 are converted into negative pressure. Here, if the retard chambers 141 or the advance chambers 142 are in negative pressure and air is drawn into the retard chambers 141 or the advance chambers 142 from the drain passage 53, the vane rotor 130 may rattle. However, in the hydraulic oil control valve 10 of the present embodiment, the hydraulic oil is stored in the portion of the drain passage 53 between the protrusion P and the camshaft 320 due to the centrifugal force of the rotation of the hydraulic oil control valve 10 and the oil film OF of the hydraulic oil is formed on the inner circumferential surface of the spool 50. Therefore, since the drain inlet 54 is covered by the oil film OF, it is possible to restrict air from being drawn into the retard chambers or advance chambers, which are in the negative pressure, from the drain passage 53 through the drain inlet 54.

According to the hydraulic oil control valve 10 of the valve timing adjustment device 100 of the first embodiment described above, the protrusion P protruding radially inward with respect to the drain inlet 54 is formed between the drain inlet 54 and the drain outlet 55 of the spool 50 in the axial direction AD. Thus, it is possible to restrict the hydraulic oil having flowed into the drain passage 53 through the drain inlet 54 from immediately flowing out through the drain outlet 55, to store the hydraulic oil in the portion of the drain passage 53 between the protrusion P and the camshaft 320, and to form the oil film OF of the hydraulic oil on the inner circumferential surface of the spool 50. Therefore, the oil film OF can restrict air in the drain passage 53 from being drawn into the retard chambers 141 or the advance chambers 142, which are in the negative pressure, through the drain inlet 54. Therefore, it is possible to prevent the vane rotor 130 from acting up due to the air drawn into the retard chambers 141 and the advance chambers 142.

Further, since the drain outlet 55 is formed on the spool bottom portion 52 which is one end of the spool 50, an amount of the hydraulic oil stored in the drain passage 53 can be specified by the shape and size of the spool 50, the size of the drain outlet 55, and the like. Further, for example, since the drain outlet 55 is not formed on the bottom portion 42 or the like of the inner sleeve 40, the amount of the hydraulic oil stored in the drain passage 53 is specified by only the shape of the spool 50 or the like. Thus, it is possible to suppress fluctuations in the stored amount of the hydraulic oil due to the shapes of multiple members. Further, since the protrusion P is formed on the spool 50, it is possible to prevent the protrusion P and the drain inlet 54 from being excessively separated from each other in the axial direction AD and the oil film OF of the hydraulic oil can be formed to cover the drain inlet 54 in a state where the amount of the hydraulic oil in the drain passage 53 is relatively small.

Further, since the recycling ports 47 as the recycling mechanism are defined in the inner sleeve 40 and the drain inlet 54 and the supply ports SP1 and SP2 are in communication with each other through the recycling ports 47, the hydraulic oil having flowed out of the retard chambers 141 and the advance chambers 142 can be returned to the supply side. Therefore, the hydraulic oil having flowed out of the retard chambers 141 or the advance chambers 142 can be reused and supplied to the retard chambers 141 or the advance chambers 142 without through the oil pan 352.

Here, in general, when the amount of the hydraulic oil flowing out of the hydraulic oil control valve 10 through the drain outlet 55 is reduced by providing the recycling mechanism, the amount of the hydraulic oil flowing in the drain passage 53 is reduced and the possibility that air is drawn into the retard chambers 141 or the advance chambers 142 in the negative pressure may increase. More specifically, as shown in FIG. 6, when the retard sealing portions 57 block communications between the retard ports 27 and the retard supply ports SP1 and the retard chambers 141 do not receive a supply of the hydraulic oil from the hydraulic oil control valve 10, and when volumes of the retard chambers 141 are increased due to the fluctuation of the position of the vane rotor 130 in the circumferential direction, the retard chambers 141 are converted into negative pressure. In this case, when the amount of the hydraulic oil flowing through the drain passage 53 is reduced, the possibility that air is drawn into the retard chambers 141 from the drain passage 53 may increase. Further, as shown in FIG. 3, when the advance sealing portions 58 block communications between the advance ports 28 and the advance supply ports SP2 and the advance chambers 142 do not receive a supply of the hydraulic oil from the hydraulic oil control valve 10, and when volumes of the advance chambers 142 are increased due to the fluctuation of the position of the vane rotor 130 in the circumferential direction, the advance chambers 142 are converted into negative pressure. In this case, when the amount of the hydraulic oil flowing through the drain passage 53 is reduced, the possibility that air is drawn into the advance chambers 142 from the drain passage 53 may increase.

However, according to the hydraulic oil control valve 10 of the present embodiment, the hydraulic oil can be stored in the drain passage 53 by the protrusion P and the oil film OF can be formed on the inner circumferential surface of the spool 50. Thus, even if the recycling mechanism is provided, the air in the drain passage 53 can be restricted from being drawn into the retard chambers 141 or the advance chambers 142 which are in negative pressure.

Further, the hydraulic oil discharged from the vane rotor 130 flows to the hydraulic oil control valve 10 and flows out of the hydraulic oil control valve 10 through the drain passage 53 and the drain outlet 55 regardless of whether the valve timing is adjusted in the advance direction or in the retard direction. Therefore, the oil film OF can always be formed in the drain passage 53 during the operation of the internal combustion engine 300.

Further, since at least a portion of the drain passage 53 is formed in the spool 50, a passage cross-sectional area of the drain passage 53 can be increased. Therefore, it is possible to prevent a passage resistance when the hydraulic oil flows out of the hydraulic oil control valve 10 from increasing. Therefore, deterioration of the performance of the hydraulic oil control valve 10 such as a delay in the operation of the hydraulic oil control valve 10 can be suppressed.

Further, since the sleeve 20 has a double-structure including the outer sleeve 30 and the inner sleeve 40, the hydraulic oil supply passage 25 can be easily defined by a space between the axial hole 34 formed in the outer sleeve 30 and the inner sleeve 40. Therefore, as compared with a configuration in which an inside of the spool serves as the hydraulic oil supply passage, it is possible to suppress the hydraulic pressure from being applied to the spool 50 when supplying the hydraulic oil and to suppress deterioration of the slidability of the spool 50. Further, since the sleeve 20 has the double-structure, the ports SP1, SP2, 23, 24, and 47 can be easily defined in the inner sleeve 40. Therefore, the workability of each of the ports SP1, SP2, 27, 28, and 47 in the sleeve 20 can be improved and the manufacturing process of the sleeve 20 can be restricted from becoming complicated. Further, since the workability can be improved, the degree of freedom in designing each port SP1, SP2, 27, 28, 47 can be improved, and the mountability of the hydraulic oil control valve 10 and the valve timing adjustment device 100 can be improved.

B. Second Embodiment

Figure 9:
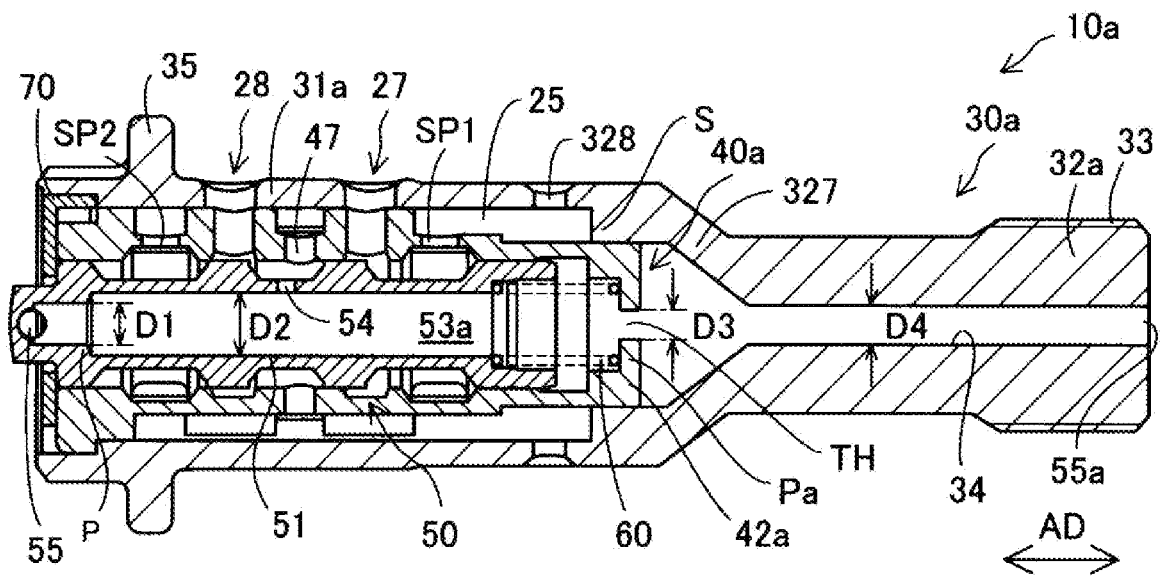
FIG. 9 is a cross-sectional view showing a schematic configuration of a hydraulic oil control valve of a second embodiment.

A hydraulic oil control valve 10a of a second embodiment shown in FIG. 9 is different from the hydraulic oil control valve 10 of the first embodiment in a hydraulic oil supply mechanism and a hydraulic oil drain mechanism. More specifically, the hydraulic oil control valve 10a of the second embodiment is different from the hydraulic oil control valve 10 of the first embodiment in that an outer sleeve 30a and an inner sleeve 40a are provided in place of the outer sleeve 30 and the inner sleeve 40 and a second drain outlet 55a is provided in addition to the drain outlet 55. Since the other configurations are the same as those in the first embodiment, the same configurations are designated by the same reference numerals, and detailed description thereof will be omitted.

The outer sleeve 30a of the hydraulic oil control valve 10a of the second embodiment includes a main body 31a and a fixing portion 32a in place of the main body 31 and the fixing portion 32 and includes a small diameter portion 327 connected between the main body 31a and the fixing portion 32a in the axial direction AD.

The main body 31a defines a supply hole 328 between the outer retard ports 21 and the camshaft 320 in the axial direction AD. The supply hole 328 passes through the main body 31a between an outer circumferential surface and an inner circumferential surface of the main body 31a. Hydraulic oil is supplied into the supply hole 328 from the hydraulic oil supply source 350.

The fixing portion 32a has an outer diameter and an inner diameter each of which is smaller than that of the main body 31a. The fixing portion 32a has an inner space. The inner space of the fixing portion 32a and the inner space of the spool 50 serve as a drain passage 53a. The fixing portion 32a has an end portion closer to the camshaft 320. The end of the fixing portion 32a defines the second drain outlet 55a. The hydraulic oil in the drain passage 53a is discharged out of the hydraulic oil control valve 10a through the second drain outlet 55a and the shaft hole portion 322 defined in the camshaft 320 shown in FIG. 1. As shown in FIG. 9, the hydraulic oil in the drain passage 53a flows out of the hydraulic oil control valve 10a through both the drain outlet 55 defined in the spool bottom portion 52 of the spool 50 and the second drain outlet 55a defined in the outer sleeve 30a.

The small diameter portion 327 has an inner diameter less than that of the main body 31a. More specifically, the inner diameter of the small diameter portion 327 gradually decreases from a portion of the small diameter portion 327 closer to the solenoid 160 toward the camshaft 320. The small diameter portion 327 has a sealing portion S. The sealing portion S separates the hydraulic oil supply passage 25 from the drain passage 53a. The sealing portion S has an inner diameter substantially the same as an outer diameter of an end portion of the inner sleeve 40a closer to the camshaft 320.

The inner sleeve 40a has a bottom portion 42a in place of the bottom portion 42. The bottom portion 42a has a through hole TH passing through the bottom portion 42a in the axial direction AD substantially at a center of the bottom portion. Thus, the end portion of the inner sleeve 40a closer to the camshaft 320 includes a protrusion Pa protruding radially inward to surround the through hole TH. The protrusion Pa extends radially inward beyond the drain inlet 54.

The protrusion P formed in the spool 50 has an inner diameter D1 that is less than an inner diameter D2 of the spool tubular portion 51. Further, the protrusion Pa formed in the inner sleeve 40a has an inner diameter D3 that is less than the inner diameter D1 of each of the protrusion P and the inner diameter D2 of the spool tubular portion 51. Further, the axial hole 34 defined in the fixing portion 32a has an inner diameter D4 substantially the same as the inner diameter D1 of the protrusion P. The inner diameter D3 of the protrusion Pa may be substantially the same as the inner diameter D1 of the protrusion P or may be larger than the inner diameter D1 of the protrusion in a range less than the inner diameter D2 of the spool tubular portion 51. Further, the inner diameter D4 of the axial hole 34 defined in the fixing portion 32a is not limited to substantially the same as the inner diameter D1 of the protrusion P and may be formed in any size.

In the present embodiment, the drain outlet 55 and the second drain outlet 55a correspond to subordinate concepts of the opening in the present disclosure, respectively.

According to the hydraulic oil control valve 10a of the second embodiment described above, effects similar to those of the hydraulic oil control valve 10 of the first embodiment are obtained. In addition, the protrusion P extending radially inward beyond the drain inlet 54 is formed between the drain inlet 54 and the drain outlet 55 in the axial direction AD and the protrusion Pa extending radially inward beyond to the drain inlet 54 is formed between the drain inlet 54 and the second drain outlet 551 in the axial direction AD. Further, each of the inner diameter D1 of the protrusion P and the inner diameter D3 of the protrusion Pa is smaller than the inner diameter D2 of the spool tubular portion 51. Therefore, the oil film of the hydraulic oil can be formed due to the centrifugal force of the hydraulic oil control valve 10a in an area of the drain passage 53a between the protrusion P and the protrusion Pa. In other words, the oil film of the hydraulic oil can be formed due to the centrifugal force of the hydraulic oil control valve 10a in a portion of the drain passage 53a between the protrusion P and the drain inlet 54 and a portion of the drain passage 53a between the protrusion Pa and the drain inlet 54. Therefore, it is possible to prevent the air in the drain passage 53a from being drawn into the retard chambers 141 or the advance chambers 142 which are in negative pressure through the drain inlet 54.

C. Third Embodiment

Figure 10:
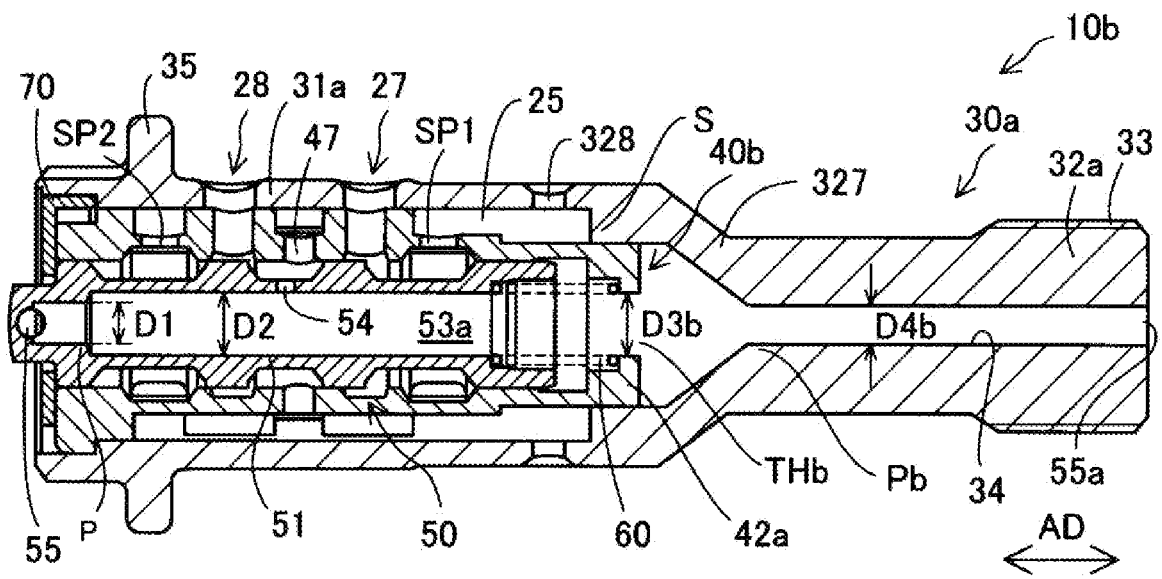
FIG. 10 is a cross-sectional view showing a schematic configuration of a hydraulic oil control valve of a third embodiment.

A hydraulic oil control valve 10b of a third embodiment shown in FIG. 10 is different from the hydraulic oil control valve 10a in that the hydraulic oil control valve 10n includes an inner sleeve 40b in place of the inner sleeve 40a and a protrusion Pb in place of the protrusion Pa. Since the other configurations are the same as those in the second embodiment, the same configurations are designated by the same reference numerals, and detailed description thereof will be omitted.

The inner sleeve 40b of the hydraulic oil control valve 10b of the third embodiment defines a through hole THb that is larger than the through hole TH of the second embodiment. Thus, an end portion of the inner sleeve 40b closer to the camshaft 320 does not protrude radially inward with respect to the drain inlet 54. The through hole THb has an inner diameter D3b substantially the same as the inner diameter D2 of the spool tubular portion 51. However, the inner diameter D3b may be larger than the inner diameter D2 of the spool tubular portion 51.

The small diameter portion 327 of the outer sleeve 30a includes the protrusion Pb. The protrusion Pb is a portion of the small diameter portion 327 that has smallest diameter in the small diameter portion 327 and is located inside with respect to the drain inlet 54 in the radial direction. The inner diameter D4b of the protrusion Pb is less than each of the inner diameter D1 of the protrusion P and the inner diameter D2 of the spool tubular portion 51. The inner diameter D4b of the protrusion Pb may be substantially the same as the inner diameter D1 of the protrusion P or may be larger than the inner diameter D1 of the protrusion in a range less than the inner diameter D2 of the spool tubular portion 51.

According to the hydraulic oil control valve 10b of the third embodiment described above, effects similar to those of the hydraulic oil control valve 10 of the second embodiment can be obtained. In addition, the protrusion P extending radially inward beyond the drain inlet 54 is formed between the drain inlet 54 and the drain outlet 55 in the axial direction AD and the protrusion Pb extending radially inward beyond the drain inlet 54 is formed between the drain inlet 54 and the second drain outlet 551 in the axial direction AD. Further, each of the inner diameter D1 of the protrusion P and the inner diameter D4b of the protrusion Pb is smaller than the inner diameter D2 of the spool tubular portion 51, and the inner diameter D3b of the through hole THb is substantially the same as the inner diameter D2 of the spool tubular portion 51. Therefore, the oil film of the hydraulic oil can be formed due to the centrifugal force of the hydraulic oil control valve 10b in an area of the drain passage 53a between the protrusion P and the protrusion Pb. In other words, the oil film of the hydraulic oil can be formed due to the centrifugal force of the hydraulic oil control valve 10b in a portion of the drain passage 53a between the protrusion P and the drain inlet 54 and a portion of the drain passage 53a between the protrusion Pb and the drain inlet 54. Therefore, it is possible to prevent the air in the drain passage 53a from being drawn into the retard chambers 141 or the advance chambers 142 which are in negative pressure through the drain inlet 54. Further, since the protrusion Pb is formed on the outer sleeve 30a, the amount of the hydraulic oil stored in the drain passage 53a can be increased.

D. Other Embodiments

Figure 11:
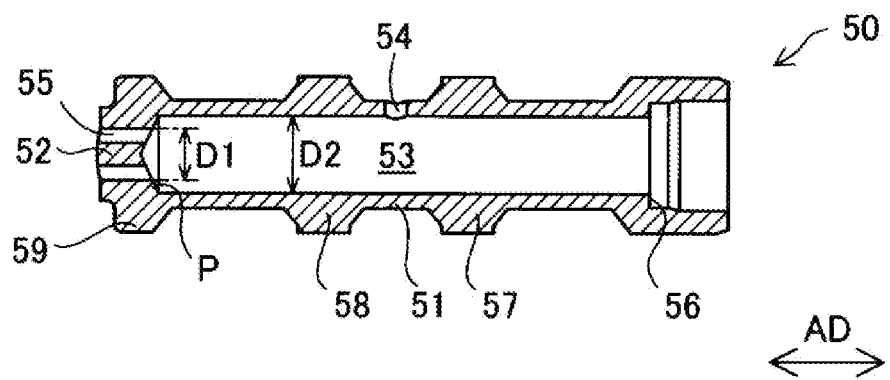
FIG. 11 is a cross-sectional view showing a detailed configuration of a spool according to another embodiment.

The configuration of the drain outlet 55 formed on the spool 50 in each of the above embodiments is merely an example and can be variously altered. For example, as shown in FIG. 11, the drain outlet 55 may open in the axial direction AD. Even with such a configuration, the same effect as those of each of the above described embodiments can be obtained.

In the second and third embodiments, the two drain outlets 55 and 55a are defined, but the drain outlet 55 may be omitted and only the second drain outlet 55a may be defined. In such an embodiment, the protrusion P may be omitted. That is, in general, at least one of the sleeve 20 and the spool 50 may define an opening through which the hydraulic oil in the drain passage 53, 53a flows out of the hydraulic oil control valve 10, 10a, 10b. Such a configuration also achieves the same effects as those of the second and third embodiments described above.

The configurations of the hydraulic oil control valves 10, 10a, and 10b in the above embodiments are merely examples and can be variously changed. For example, the hydraulic oil flowing out of the vane rotor 130 may flow out of the hydraulic oil control valve 10, 10a, 10b through the drain passage 53, 53a and the drain outlet 55, 55a only when the valve timing is adjusted in either one of the advance direction or the retard direction. In such an embodiment, when the valve timing is adjusted in the other of the advance direction and the retard direction, the hydraulic oil may flow out of the hydraulic oil control valve 10, 10a, 10b without through the drain passage 53, 53a. Further, for example, another opening for draining the hydraulic oil in the drain oil passages 53, 53a to a reservoir tank or the like as an outside of the hydraulic oil control valve 10, 10a, 10b may be defined and a protrusion protruding radially inward with respect to the drain inlet 54 may be formed between the another opening and the drain inlet 54 in the axial direction AD. Further, for example, the recycling mechanism by the recycling ports 47 may be omitted, and the drain inlet 54 and the supply ports SP1 and SP2 may not be in communication with each other. For example, the sleeve 20 is not limited to the double-structured sleeve 20 including the outer sleeve 30, 30a and the inner sleeve 40, 40a, 40b, and may be composed of a single member. Further, fixing method of the hydraulic oil control valve 10, 10a, 10b to the end portion 321 of the camshaft 320 is not limited to fastening between the male thread portion 33 and the female thread portion 324. The fixing to the end portion 321 of the camshaft 320 may be realized by any method such as welding. Further, the present disclosure is not limited to the solenoid 160 and any actuators such as an electric motor and an air cylinder may drive the hydraulic control valve. Such a configuration also achieves the same effects as those of the embodiment described above.

In each of the above embodiments, the valve timing adjustment device 100 adjusts the valve timing of the intake valve 330 that is opened and closed by the camshaft 320, but the valve timing adjustment device 100 may adjust the valve timing of the exhaust valve 340. Further, the valve timing adjustment device 100 may be fixed to the end portion 321 of the camshaft 320 as a driven shaft to which a driving force is transmitted from the crankshaft 310 as the driving shaft through an intermediate shaft, or may be fixed to one of the end of the drive shaft and the end of the driven shaft of the camshaft having the double structure.

The present disclosure should not be limited to the embodiments described above, and various other embodiments may be implemented without departing from the scope of the present disclosure. For example, the technical features in each embodiment corresponding to the technical features in the form described in the summary may be used to solve some or all of the above-described problems, or to provide one of the above-described effects. In order to achieve a part or all, replacement or combination can be appropriately performed. Also, if the technical features are not described as essential in the present specification, they may be omitted as appropriate.

What is claimed is:

1. A hydraulic oil control valve for a valve timing adjustment device, the valve timing adjustment device being configured to adjust valve timing of a valve and fixed to an end portion of one shaft that is a drive shaft or a driven shaft, the driven shaft being configured to selectively open and close the valve with a driving force transmitted from the drive shaft, the hydraulic oil control valve being coaxially disposed with a rotational axis of the valve timing adjustment device and configured to control a flow of a hydraulic oil supplied from a hydraulic oil supply source, the hydraulic oil control valve comprising:
   a tubular sleeve that has an outer sleeve having a tubular portion and an inner sleeve disposed inside the outer sleeve and having a tubular portion; and
   a tubular spool that has an end portion in contact with an actuator and that is located inward of the tubular sleeve in a radial direction and slidably moved by the actuator in an axial direction, wherein
   the spool has therein a drain passage through which the hydraulic oil discharged from a phase shifting portion of the valve timing adjustment device flows,
   the spool defines a drain inlet that guides the hydraulic oil discharged from the phase shifting portion into the drain passage, and
   at least one of the tubular sleeve or the spool defines an opening through which the hydraulic oil in the drain passage is discharged from the hydraulic oil control valve,
   the hydraulic oil control valve further comprises
   a protrusion disposed at a position between the drain inlet and the opening, wherein
   the protrusion extends inward in the radial direction beyond the drain inlet,
   the inner sleeve defines, at the tubular portion of the inner sleeve, a supply port fluidly connected to the hydraulic oil supply source and a recycle port fluidly connected to the supply port, and
   the drain inlet is fluidly connected to the recycle port.

2. The hydraulic oil control valve according to claim 1, wherein
   the opening is defined in the end portion of the spool.

3. The hydraulic oil control valve according to claim 1, wherein
   the protrusion is formed in the spool.

4. The hydraulic oil control valve according to claim 1, wherein
   the hydraulic oil discharged from the phase shifting portion flows out of the hydraulic oil control valve through the drain passage and the opening both when the valve timing is adjusted in an advance direction and when the valve timing is adjusted in a retard direction.

5. A valve timing adjustment device comprising the hydraulic oil control valve according to claim 1.

6. The hydraulic oil control valve according to claim 1, wherein
   the recycle port is a through hole passing through the tubular portion of the inner sleeve between an outer circumferential surface and an inner circumferential surface of the inner sleeve.

7. The hydraulic oil control valve according to claim 1, wherein
   the phase shifting portion defines an advance chamber and a retard chamber,
   the supply port includes a first supply port fluidly connected to the retard chamber and a second supply port fluidly connected to the advance chamber, and the recycle port is defined between the first supply port and the second supply port in the axial direction.

\* \* \* \* \*